(12) United States Patent
Covati et al.

(10) Patent No.: US 10,735,398 B1
(45) Date of Patent: Aug. 4, 2020

(54) ROLLING CODE AUTHENTICATION TECHNIQUES

(71) Applicant: Bandwidth, Inc., Raleigh, NC (US)

(72) Inventors: Adam Covati, Durham, NC (US); Bryan C. Turner, Durham, NC (US)

(73) Assignee: Bandwidth, Inc., Raleigh, NC (US)

( * ) Notice: Subject to any disclaimer, the term of this patent is extended or adjusted under 35 U.S.C. 154(b) by 0 days.

(21) Appl. No.: 16/801,811

(22) Filed: Feb. 26, 2020

(51) Int. Cl.
H04L 29/06 (2006.01)
H04L 9/08 (2006.01)
H04L 9/32 (2006.01)

(52) U.S. Cl.
CPC ............ H04L 63/08 (2013.01); H04L 9/0861 (2013.01); H04L 9/3228 (2013.01); H04L 63/0428 (2013.01)

(58) Field of Classification Search
CPC .... H04L 63/083; H04L 9/0861; H04L 9/3228
See application file for complete search history.

(56) References Cited

U.S. PATENT DOCUMENTS

| | | | | |
|---|---|---|---|---|
| 9,002,750 | B1* | 4/2015 | Chu | H04L 63/0838 705/72 |
| 9,419,968 | B1* | 8/2016 | Pei | H04W 12/0608 |
| 10,089,810 | B1* | 10/2018 | Kaye | G07C 9/00309 |
| 2004/0030932 | A1* | 2/2004 | Juels | H04W 12/06 713/151 |
| 2007/0037552 | A1* | 2/2007 | Lee | G06Q 20/388 455/410 |
| 2008/0110983 | A1* | 5/2008 | Ashfield | G06Q 20/40975 235/382 |
| 2008/0184036 | A1* | 7/2008 | Kavsan | H04L 9/3271 713/184 |
| 2011/0321145 | A1* | 12/2011 | Shimotono | H04L 9/3228 726/7 |
| 2011/0321146 | A1* | 12/2011 | Vernon | H04L 9/3228 726/7 |
| 2012/0159591 | A1* | 6/2012 | Payne | G09C 5/00 726/7 |
| 2014/0196118 | A1* | 7/2014 | Weiss | H04W 12/06 726/4 |
| 2014/0351596 | A1* | 11/2014 | Chan | H04L 63/0876 713/170 |
| 2015/0067798 | A1* | 3/2015 | McCown | G06F 21/31 726/6 |
| 2016/0294804 | A1* | 10/2016 | Yamahara | H04L 63/102 |
| 2016/0352722 | A1* | 12/2016 | Johri | G06Q 20/325 |
| 2017/0286651 | A1* | 10/2017 | Erhart | G06F 21/31 |
| 2018/0137268 | A1* | 5/2018 | Sawant | G06F 21/316 |
| 2018/0255053 | A1* | 9/2018 | Bhabbur | H04L 63/0838 |

(Continued)

*Primary Examiner* — Jason Chiang
(74) *Attorney, Agent, or Firm* — Gregory Stephens

(57) ABSTRACT

Techniques are described for single or multi-factor authentication. An access request is received followed by a prompt for authentication data comprising a segment of a continuous rolling authentication code. Upon receipt of the segment of a continuous rolling authentication code, it is compared to another version of the continuous rolling authentication code generated by an algorithm and shared secret key known to both parties. The access request may be authenticated when the segment of the rolling authentication code received in response to the prompt for authentication data matches a segment the continuous rolling authentication code generated. Otherwise, it is rejected.

27 Claims, 5 Drawing Sheets

(56) References Cited

U.S. PATENT DOCUMENTS

2019/0306159 A1* 10/2019 Agarwal ................. H04L 9/321
2020/0014683 A1* 1/2020 Russell ................. G07F 17/329
2020/0074070 A1* 3/2020 Boodaei ............. H04L 63/0846
2020/0112585 A1* 4/2020 Keohane ............... G06F 21/316

* cited by examiner

200

300

300

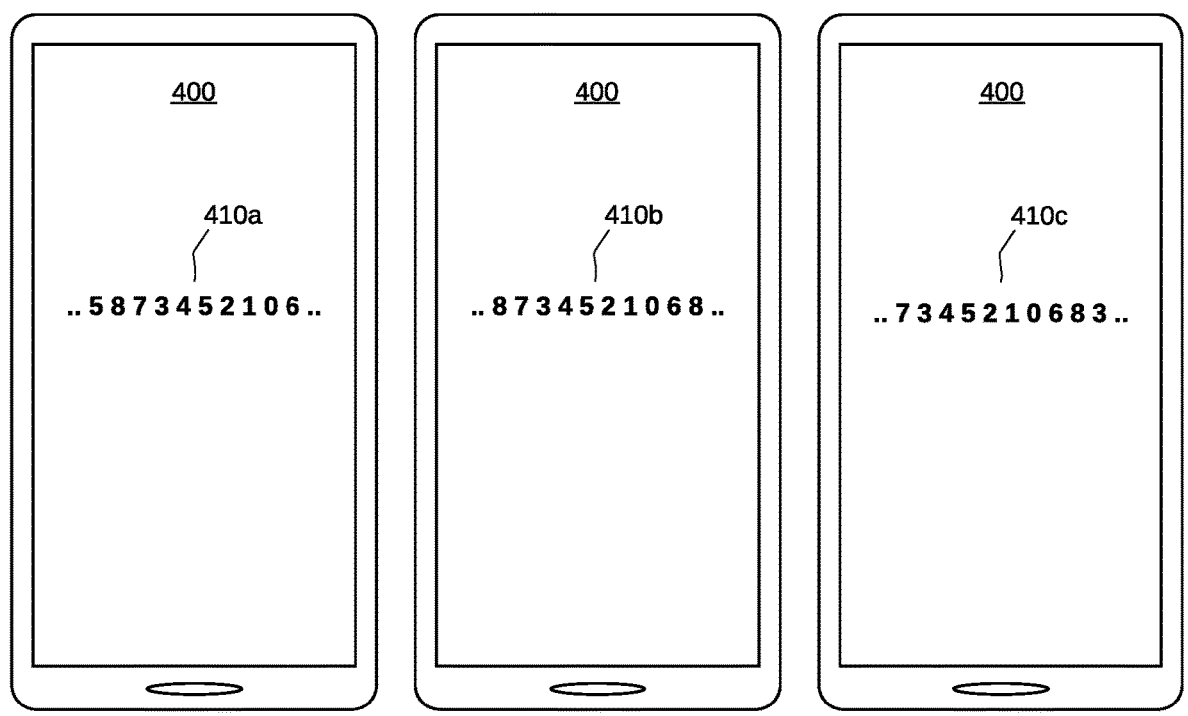

US 10,735,398 B1

ROLLING CODE AUTHENTICATION TECHNIQUES

TECHNICAL FIELD

The present invention relates generally to techniques for implementing an authentication method using a rolling number code generated by an algorithm.

BACKGROUND

Multi-factor authentication or MFA is a means for providing enhanced security to a login process by requiring the person attempting to login to an account or access something that has been secured to provide a second level or even a third level of identity confirmation before being granted access. Typically, the first level of authentication is for the user to input a user ID and password combination. Once that has been satisfied, the program accepting the login information will initiate its own MFA process. A typical MFA system will require the user to enter a one-time algorithmically generated numeric or alphanumeric code generated by and known to the program accepting the login information and provided to the person attempting to login via a secondary delivery mechanism such as, for instance, a short message service (SMS) text message. If the login procedure employs further means of authentication, those may include answering a personal question that has been previously entered and answered such as, for instance, "what color was your first car?" Collectively, the additional levels of authentication enhance the overall security of the login procedure.

The techniques described herein are directed to a particular authentication process termed rolling code authentication. The rolling code authentication technique described herein may be used in conjunction with one or more other authentication techniques to create a multi-factor authentication process.

Alternatively, the program accepting the access request information through its account login page may employ a 3rd party authentication system that uses algorithms and shared secret keys to generate temporary character codes. There are many commercial products or systems that provide the character generating part of the system. One such product is the Google authenticator application. Google authenticator is an application that may be downloaded to and executed on a mobile computing device like a smartphone, a tablet computing device, a laptop computing device, a desktop computing device, or a special purpose hardware fob. Regardless of the type of computing device used, the function is essentially the same.

Specifically, an authentication system will generate a Time-based One-Time Password (TOTP) using an algorithm. The password (typically a string between six and eight characters in length) will be displayed by an application like Google Authenticator for a defined short duration— e.g., 30 seconds before it disappears and the next TOTP character string is generated. The user must input the current TOTP character string before it expires into a box provided by the account login page. If the entered character string does not match the expected character string, the access request will fail. In TOTP authentication systems, the user and the program accepting the access request information share a secret key that allows each to use the TOTP algorithm to generate the exact same TOTP character string.

Because the access request page is also privy to the stream of TOTP character strings generated it can compare the entered character string with the actual character string(s). Often, a grace period may be built into the process wherein a TOTP character string entered may have expired during entry but is sufficiently close in time to the period in which the TOTP character string existed. In such cases, the account access request program may still accept the 'late' entry of the recently expired TOTP character string. This grace period may be controlled by the account access request program such that it may be programmed to accept any valid TOTP character string that occurred within the last "x" number of minutes. The greater the value for "x", the less secure the system may be but it may be justified nonetheless by the account access request program. It should also be noted that the length of the TOTP character string may be controlled as well. A six character TOTP character string like that described above is merely exemplary. Thus, there may be a tradeoff between a longer length of a TOTP character string (more secure) with the requirement for a longer acceptance window (less secure) because humans need more time to type in the longer number.

What is needed are techniques to provide a more robust and secure TOTP character string authentication application.

BRIEF DESCRIPTION OF THE DRAWINGS

FIG. 4 illustrates an example of a screenshot executing embodiments of the present disclosure.

DETAILED DESCRIPTION

Figure 1:
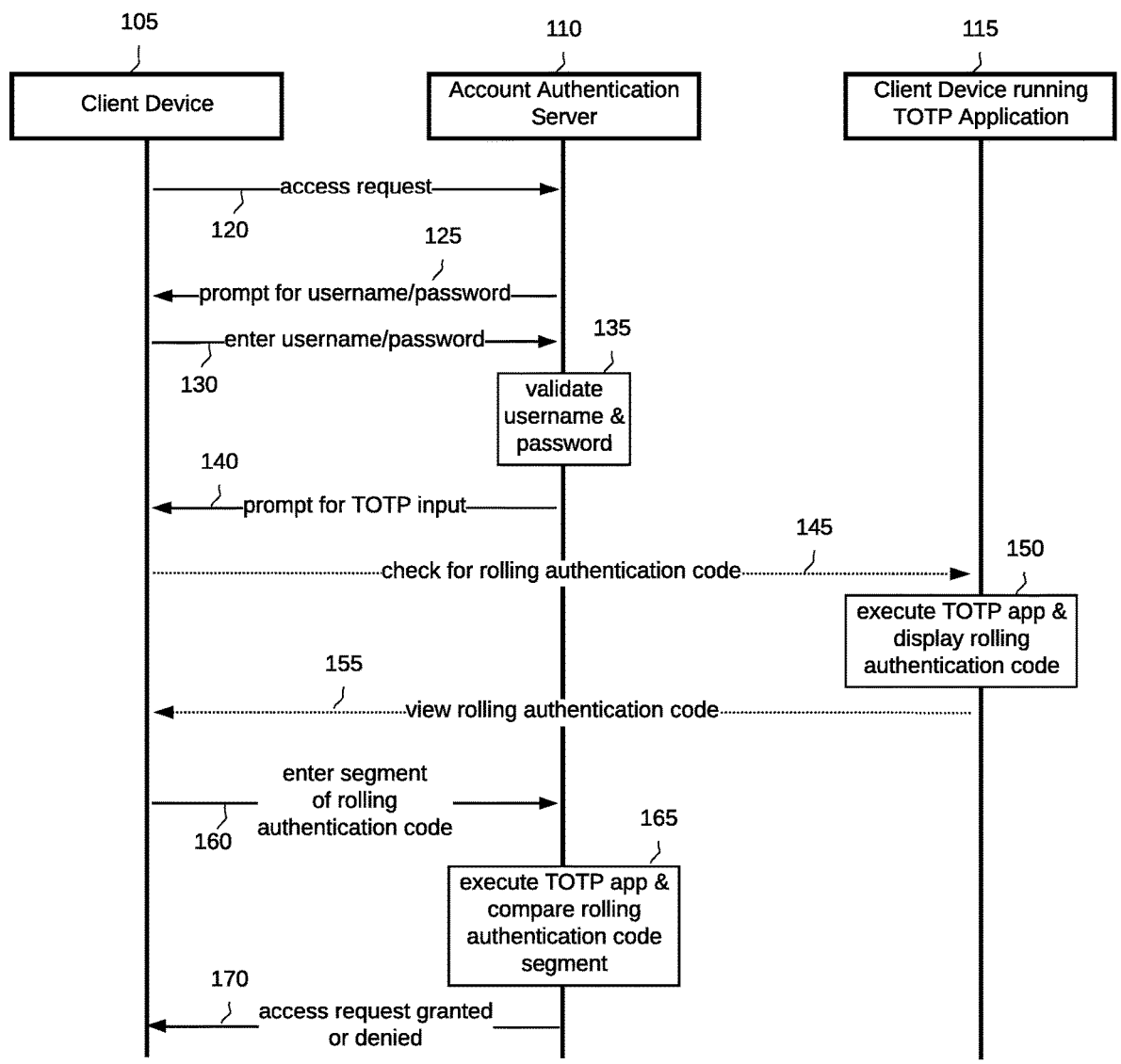
FIG. 1 illustrates a message flow diagram for implementing certain example embodiments of the present disclosure.

The embodiments described herein disclose arrangements (e.g., systems, methods, logic) for performing TOTP authentication that may be implemented as a standalone security check or as part of a multi-factor authentication (MFA) technique. One of the issues with many TOTP systems is the timeout period associated with a given random generated code—wherein a code may be characterized as a string of characters. Users that are prompted for a specific TOTP code may have to wait for a new code if the current code is close to the end of its useful period and will disappear from sight. In such cases, the user may have to pause or slow down the overall access request process to wait for a new code. The description below describes an TOTP system based on a rolling authentication code that gives more flexibility to the application requiring authentication. Thus, the TOTP authentication code is essentially a continuous string of characters in which a new character is algorithmically generated every few seconds. It should be noted that the TOTP authentication code may comprise characters such as, for instance, digits, alpha-numeric characters, ASCII characters, symbols or any combination thereof.

Typically, the length of the code for a given authenticator program/app is fixed. However, if a variable length code were implemented, the application requiring it could also set the length of the code that would be acceptable. This may provide an extra level of security. For instance, if a 10 character TOTP code were required, the level of security may be deemed higher than if a 3 character TOTP code were required. In another example, an access request occurring from a known secure location (e.g., known IP address or physical location) on a known piece of hardware (e.g., known device ID) may only require a 3 character TOTP code while an access request from an unsecure public location and/or on an unknown piece of hardware may require a 10 character TOTP value. For instance, the length of the code may be increased based on the location of the device attempting to login or the hardware identification of the device trying to login. Another consideration may be the status of the server and/or network being logged into. For instance, if the server and/or network is experiencing anomalous behavior (e.g. DOS, DDOS, compromised firewall, etc.), the degree of security may be heightened requiring a more secure response in the form of a longer segment of the rolling authentication code.

Many software programs/applications may be accessed by the same user from different locations and/or using different hardware devices. A user's typical login request may emanate from the same IP address (e.g., location) on the same device (e.g., MAC address) and therefore the level of security may be relaxed somewhat making a 4 character authentication code sufficient. But, if the user attempts to login from an IP address not recognized or from a geographic location that is unusual, or from a device with a hardware identifier that is not recognized, the software program/application's authentication module may automatically increase the security level by requiring a longer segment of code for authentication. The authentication module may adjust the security level via the segment length based on its history with the user vis-à-vis devices and locations used to gain access to the software program/application.

In another embodiment, an acceptable error rate can be built-in to the system, such that some number of incorrect characters are allowed, but may require additional correct characters to recover security. For example, if the security level is "4 characters", and the user types 2 correct characters, then 1 incorrect characters, then 1 correct characters, the system may be configured to require 2 additional correct characters before authenticating. The additional characters solution be implemented rather than rejecting and requiring 4 new characters. Such an implementation may allow recovery from an inadvertent typo quickly without sacrificing security.

Reference will now be made in detail in various and alternative example embodiments and to the accompanying figures in which like numerals represent substantially identical elements. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

In turning to a more detailed description, FIG. 1 illustrates an example message or process flow 100 describing the interactions among a client device 1105 running an application that requires TOTP authentication to gain access to the application, an account authentication server/application 110 tasked with verifying a segment of the rolling TOTP authentication code entered by the user, and a second client device 115 executing a companion TOTP application for receiving and displaying the rolling authentication code.

The process may be initiated when a user submits an access request 120 from their client device 105 to the account authorization server 110. In a client/server model, a user may be locally executing all or part of a software application on the client device 105. For security purposes, the software application may require an authorization/authentication process before granting access to the data and operations of the software. The most common and ubiquitous authorization/authentication process is the User ID/password pairing 125, 130. The software application maintains a table of registered users and their passwords. Access to the software may only be granted upon the successful entry and validation of this data 135. Many software programs/applications stop here from a security standpoint in what may be considered a single factor authentication process. However, for enhanced security, many software programs/applications require additional level(s) of authentication prior to granting access in what may be considered a multi-factor authentication process or MFA. It should be noted that the techniques presented herein may also be applied to 3-factor or n-factor authentication processes in which the rolling code techniques described herein are but one of the 'n' authentication steps even if n=1.

In addition, the account authorization server 110 has been depicted as a separate entity from the client device 105 indicating a client/server model in which communication between the client device 105 and the account authorization server 110 is needed to verify the access request and MFA information and/or perform the actual processing for the software program/application. In the event it is a cloud based application, the client device 105 accesses the software program/application by means of a web browser or specialized web-based user interface running on the client device 105.

In the alternative, the functions of the account authorization server 110 described herein may be performed by the software program/application running on the client device 105. This may be the case when the software program/application is locally hosted and executed by the client device 105. In such a case, the software program/application will have a TOTP application included so as to be able to generate the rolling authentication code that it may use to verify the input of the user.

Upon validating the username and password 135, the account authorization server 110 may then prompt the user for a segment of the rolling TOTP authentication code 140. The account authentication server 110 may recognize one or more authentication systems such as Google Authenticator™ or OKTA™, etc. giving it the ability to generate the same rolling TOTP authentication code as the user's client device running the TOTP application 115. As will be described later, the length of the segment may be determined by the account authentication server 120.

At this point, the user must access their rolling TOTP authentication code application 150 which is continually generating the rolling TOTP authentication code 155 on their client device running the TOTP application 115. The rolling TOTP authentication code application often runs on a second client device 115 separate and distinct from the client device 110 running software program/application. Most often, the user may have the rolling TOTP authentication code application 150 running on a smartphone for convenience as it is a device that is typically with the user at all times. The rolling TOTP authentication code application may execute on any other number of networked devices including, for instance, a tablet, laptop, desktop computer, or key fob including the client device 105 that is requesting the login.

Regardless of the source of the rolling TOTP authentication code, the user views the rolling TOTP authentication code 155 and enters a segment of it into the access request prompt running on client device 105. The rolling TOTP authentication code segment is forwarded 160 to the account authentication server 110. The account authentication server 110 then compares the entered rolling TOTP authentication code segment received from client device 105 to the same rolling TOTP authentication code generated by account authentication server 110. If the received segment matches a portion of the generated rolling TOTP authentication code, the user is authenticated 165. If the received segment does not match, the user is not authenticated. The account authentication server 110 will then either grant or deny access 170 to the software program/application running on the client device 105 based on the results of the MFA authentication step.

It should be noted that the step of entering the rolling TOTP authentication code segment does not have to be performed by the user. It is sufficient that the user-controlled device communicates a portion of the code to the service-controlled device under the direction of the user. This may be the user typing in a code, or it may be a "push" from the server which prompts the user for Allow/Reject via a dialog (like Okta), or using additional hardware such as a thumb-print reader (like the iPad) as the "Allow" action.

Figure 2:
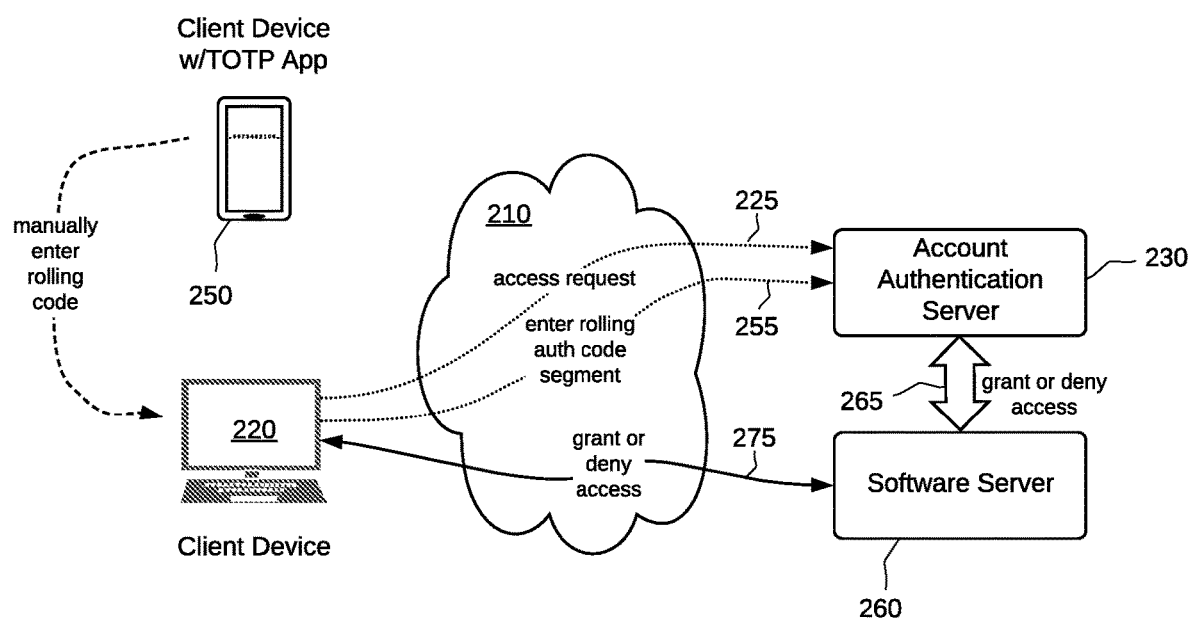
FIG. 2 illustrates an example networked environment for implementing certain example embodiments of the present disclosure.

FIG. 2 illustrates an example networked environment 200 for implementing certain example embodiments of the present disclosure. A client device 220 may be executing a software program/application that requires an MFA access request procedure. The first step may be entering a user ID/password combination and the second step may be to enter a portion of a algorithmically generated rolling TOTP authentication code. The client device 220 may be any computing device running the software program/application. In this example, the software program/application may be a web based instance in which much of the processing and data occurs on a server in a network. The software program/application is primarily a user interface (Ux) with a networked connection to a software server 260 as well as an account authentication server 230. In practice, the software server 260 and account authentication server 230 may be independent of one another or co-located and/or share processing resources.

The user may enter the user ID/password combination and forward it 225 to account authentication server 230. The account authentication server 230 functions to receive and validate access requests. It does so by validating user ID/password combinations against a table or database of registered users. The account authentication server 230 may also be capable of generating a rolling TOTP authentication code. The account authentication server 230 also performs rolling TOTP authentication code verification by comparing the rolling TOTP authentication code segments received 255 from client device 220 to the actual rolling authentication code received 245 it generates itself using the same parameters as the client device 250 of the user. Based on the comparison, the account authentication server 230 may either grant or deny 265 access to the software program/application on client device 220 which is relayed 275 by way of software server 260.

For the MFA system to work, the user must be aware of and have access to the rolling TOTP authentication code in order to enter a segment of it when prompted by the software program/application executing on client device 220. Often, the user will maintain a second client device 250 like a smartphone or key fob that is running the rolling TOTP authentication code application and continually receives 235 and displays the rolling TOTP authentication code. By accessing this second client device 250, the user may view the rolling TOTP authentication code and enter a segment of it into client device 220.

Figure 3A:
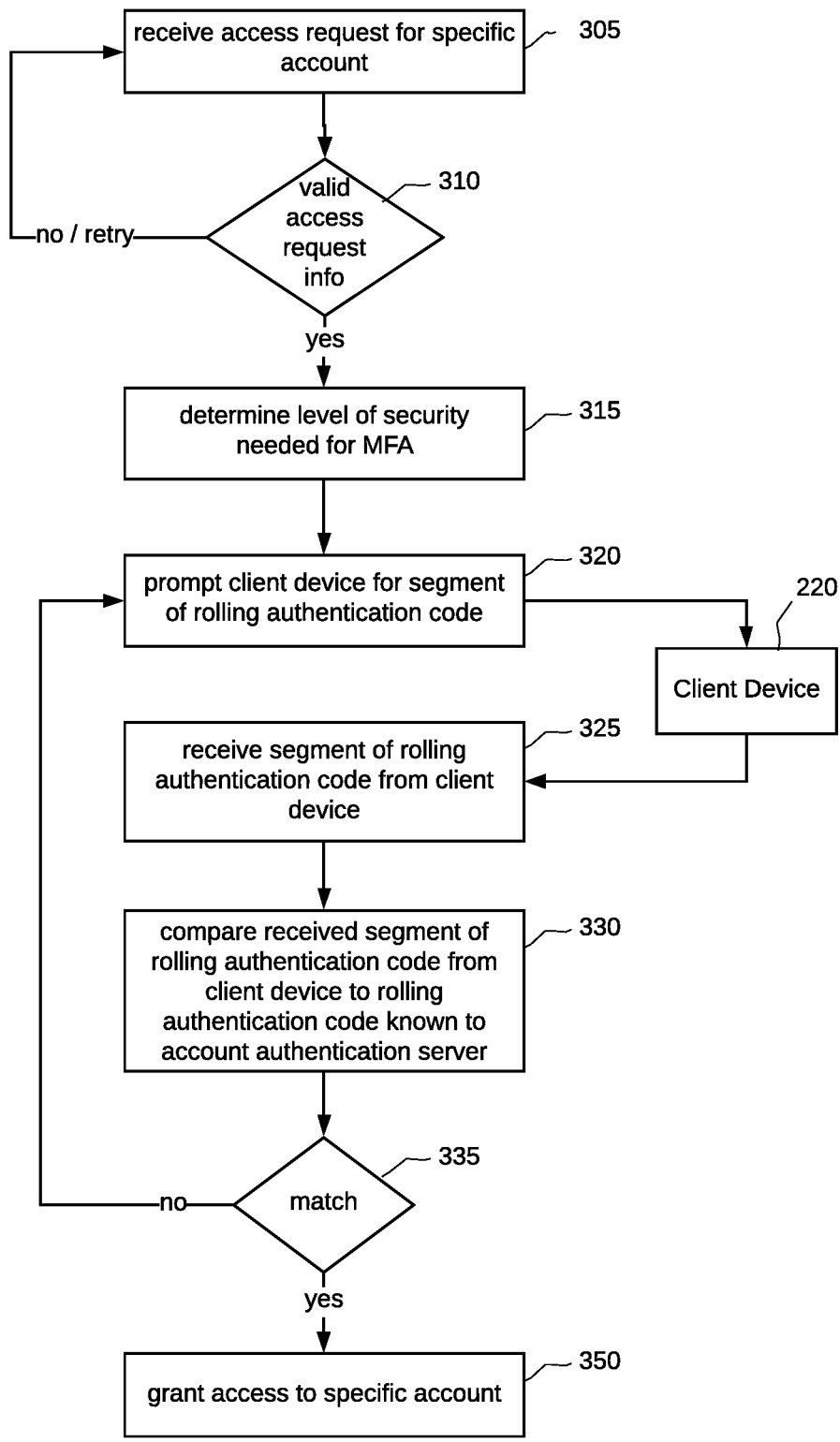
FIG. 3A illustrates a flow or logic example useful in explaining an example embodiment of the present disclosure.

FIG. 3A illustrates flow logic or methods 300 of an example embodiment. It is understood that such flow logic and methods provide merely an example of the many different types of functional arrangements that may be employed to implement operation of portions of an MFA system as described herein. At operation 305, the flow is started when a client device 220 provides, and an account authentication server 230 receives, a user ID/password combination on an access request screen for a software program/application executing on client device 220. Next, at operation 310, the account authentication server 230 determines if the user ID/password combination is valid. If not, a retry may be sent to client device 220 and control is returned to operation 305 to wait for a new user ID/password combination. If the user ID/password combination is valid the account authentication server 230 determines a level of security associated with a rolling authentication code at operation 315.

The level of security may correspond to the length of the segment of the rolling authentication code that must be entered and verified. The longer the code segment required, the more secure the authentication process. The authentication code has been described as a rolling authentication code meaning it is a continuous stream of characters with no discernible beginning or end. A new character is appended to the rolling code periodically. The period or time between adding a new character may be a design choice. For instance, a new character may be appended to the rolling authentication code every 3 seconds or every 5 seconds, etc. Also, the MFA client device that receives the streaming rolling authentication code may be configured to display any number of characters that form a streaming segment of the rolling authentication code. Additionally, the rolling authentication code has been described in terms of characters. The rolling authentication code may comprise digits, alpha-numeric characters including letters and symbols like punctuation marks, mathematical operators, or other American Standard Code for Information Interchange (ASCII) characters, and other icons or symbols like emojis, etc.

For illustrative purposes, consider a scenario in which the account authentication server 230 has determined that it will only accept a rolling authentication code segment comprising at least eight (8) characters in operation 315. The account authentication server 230 may then prompt the client device 220 at operation 320 to enter an eight character segment of the rolling authentication code. One of the unique features of the disclosure herein is that there is no single rolling authentication code segment that is correct. There may be many rolling authentication code segments that are correct depending on where the user starts and finishes entering the code. The account authentication server 230 may then receive a rolling authentication code segment from client device 220 at operation 325. As described earlier, the user may have an MFA device 250 separate from the client device 220 configured to generate the streaming rolling authentication code. It is up to the user to view the streaming rolling authentication code on MFA device 250 and manually enter a segment on client device 220.

In another embodiment, the account authorization server 230 may be configured to call a user on a specified telephone number associated with their account information for purposes of entering the rolling authentication code segment. In such a case, upon answering the call the user will be prompted to enter via touchpad (i.e., DTMF) or the user can speak the characters which may be recognized and transcribed. Other input methods could include the user drawing glyphs, digits, characters or symbols on a touch-screen, mouse gestures/clicks (drawing patterns with a mouse), or physical movements recorded via video capture (hand gestures, etc).

The account authentication server 230 is also configured to generate the streaming rolling authentication code using a version of the shared secret key TOTP application. The account authentication server 230 first verifies that the segment of the streaming rolling authentication code received from client device 220 includes the requisite minimum number of characters and compares the received segment to the actual streaming rolling authentication code at operation 330. The comparison at operation 330 may only occur if the requisite number of characters have been received.

The comparison may be performed by analyzing the streaming rolling authentication code generated by the account authentication server 230 using the shared secret key TOTP application and searching for an exact match to the rolling authentication code segment received from client device 220 by sliding it across multiple windows. For instance, if the rolling authentication code segment received from client device 220 was received at time "x", the account authentication server 230 may begin by mapping it to a window beginning at time "x−y seconds" and sliding one character at a time until reaching time "x". The look back time of "y" seconds factors the length of the code segment required as well as the period between new characters. The period between new characters may be characterized as "n" seconds. The selection of "y" is also a design choice based on the above. One method for calculating the look back period of "y" may be to multiplying the number of characters in the segment of rolling authentication code received in response to the prompt for additional data by "n".

The results of the comparison performed at operation 330 may then be subjected to a decision at operation 335 where it is determined if the segment of the streaming rolling authentication code received from client device 220 does indeed match a segment of the streaming rolling authentication code known to account authentication server 230. If there is no match, control is returned to operation 320 where the account authentication server 230 may inform client device 220 of the failure and prompt to enter another rolling authentication code segment. If there is a match, the account authentication server 230 then grants client device 220 access to the software program/application on client device 220 at operation 350.

Figure 3B:
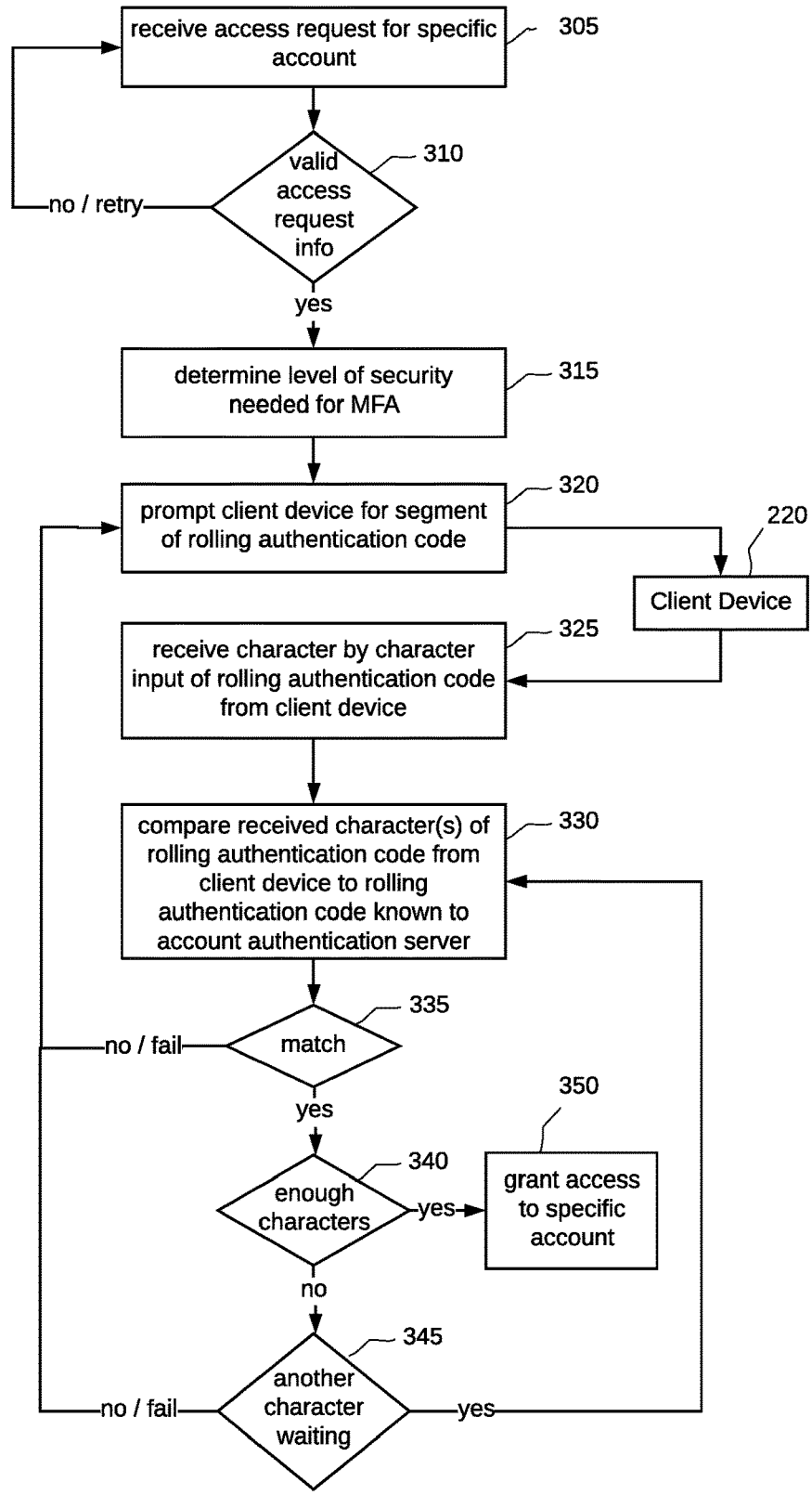
FIG. 3B illustrates a flow or logic example useful in explaining another example embodiment of the present disclosure.

FIG. 3B illustrates flow logic or methods 300 of another example embodiment. The characterizations made to parts of the system in FIG. 3A above apply equally to FIG. 3B. Like before, at operation 305, the flow is started when a client device 220 provides, and an account authentication server 230 receives, a user ID/password combination on an access request screen for a software program/application executing on client device 220. Next, at operation 310, the account authentication server 230 determines if the user ID/password combination is valid. If not, a retry may be sent to client device 220 and control is returned to operation 305 to wait for a new user ID/password combination. If the user ID/password combination is valid the account authentication server 230 determines a level of security associated with a rolling authentication code at operation 315.

For illustrative purposes, consider a scenario in which the account authentication server 230 has determined that it will only accept a rolling authentication code segment comprising at least eight (8) characters in operation 315. The account authentication server 230 may then prompt the client device 220 at operation 320 to enter an eight character segment of the rolling authentication code. Typically, the characters are entered one at a time. Sometimes, however, a complete segment may be entered. In either case, the account authorization server 230 will buffer each character. As before, one of the unique features of the disclosure herein is that there is no single rolling authentication code segment that is correct. There may be many rolling authentication code segments that are correct depending on where the user starts and finishes entering the code. The account authentication server 230 may then receive a rolling authentication code segment from client device 220 at operation 325. As described earlier, the user may have an MFA device 250 separate from the client device 220 configured to generate the streaming rolling authentication code. It is up to the user to view the streaming rolling authentication code on MFA device 250 and manually enter a segment on client device 220 or other approved mechanism (e.g., phone call).

The account authentication server 230 is also configured to generate the streaming rolling authentication code generated using a version of the shared secret key TOTP application. The account authentication server 230 then compares the received segment on a character by character basis to the actual streaming rolling authentication code at operation 330.

The results of the comparison performed at operation 330 may then be subjected to a decision at operation 335 where it is determined if the segment of the streaming rolling authentication code received from client device 220 does indeed match a segment of the streaming rolling authentication code known to account authentication server 230.

If there is no match, control is returned to operation 320 where the account authentication server 230 may inform client device 220 of the failure and prompt to enter another rolling authentication code segment. As an optional feature, the number of characters required for a segment may be increased if there was a failure. If there is a match, the account authentication server 230 checks to see if the number of characters compared are sufficient based on the predetermined requisite segment length at decision operation 340. If not enough characters have been validated, the account authentication server 230 checks at operation 345 if another character of the segment has been received and is waiting to be compared. If there is another character waiting to be compared control is returned to the comparison operation 330. Otherwise, control is returned to operation 320 where the account authentication server 230 may prompt client device 220 to enter another character of rolling authentication code segment.

If enough characters have been provided based on the decision at operation 340, the account authentication server 230 then grants client device 220 access to the software program/application on client device 220 at operation 350.

FIG. 4 illustrates examples of a screenshots 400 executing embodiments of the present disclosure. The screenshots in this example represent images of a segment of a rolling authentication code displayed on a client MFA device 250 such as, for instance, a smartphone 400. As noted earlier, the client MFA device 250 may take the form of a smartphone executing an MFA application configured to receive a rolling authentication code from an MFA server 240. The client MFA device 250 may also take the form of other computer devices with network connectivity to the MFA server 240 including, but not limited to, a key fob, a tablet, a laptop computer, a desktop computer, etc. In this example, all the characters happen to be digits. As described above, other characters may be used in addition to digits.

In the first image of smartphone 400, a ten (10) character segment 410*a* of a rolling authentication code is displayed. It reads 5 8 7 3 4 5 2 1 0 6. The second image representative of a few seconds later shows the rolling authentication code segment 410*b* reading 8 7 3 4 5 2 1 0 6 8 indicating a new character has been appended to the rolling authentication code. The smartphone 400 in this example has been configured to display ten (10) characters meaning a newly appended character causes the oldest or first displayed character to disappear. The third image representative of a few seconds later shows the rolling authentication code segment 410*c* reading 7 3 4 5 2 1 0 6 8 3 indicating yet another new character has been appended to the rolling authentication code.

For example, If the user has been prompted to enter a six (6) character code segment to satisfy an authentication process, they may enter any of the following combinations based on the illustrations in FIG. 4: 5 8 7 3 4 5; 8 7 3 4 5 2; 7 3 4 5 2 1; 3 4 5 2 1 0; 4 5 2 1 0 6; 5 2 1 0 6 8; and 2 1 0 6 8 3. Each of these segments would yield a six-character code match to the continually streaming rolling authentication code.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

The invention claimed is:

1. An access authentication method comprising:
   receiving an access request;
   prompting for authentication data pertaining to the access request, the authentication data comprising a segment of a continuous rolling authentication code comprised of characters;
   receiving, in response to the prompt for authentication data, a segment of a continuous rolling authentication code;
   comparing the received segment of the continuous rolling authentication code to a window segment of the continuous rolling authentication code of the same segment length beginning at time "x–y" seconds where "x" is the moment at which the received segment was received and "y" is a look back period;
   shifting the window segment one character at a time until there is a match between the received segment and a window segment or the time attributable to the shifted window segment is "x";
   authenticating the access request when the received segment of the continuous rolling authentication code exactly matches a window segment; and
   rejecting the access request when the received segment of the continuous rolling authentication code does not match any window segments.

2. The method of claim 1, wherein the continuous rolling authentication code is generated using a shared secret key time-based one-time password (TOTP) application.

3. The method of claim 1, wherein the continuous rolling code comprises digits, alpha-numeric characters, ASCII characters, symbols, gestures, or any combination thereof.

4. The method of claim 3, wherein the length of the segment of the continuous rolling authentication code prompted for is variable and is determined based in part on the IP address of the device making the access request.

5. The method of claim 3, wherein the length of the segment of the continuous rolling authentication code prompted for is variable and is determined based in part on a device identifier of the device making the access request.

6. The method of claim 3, wherein the length of the segment of the continuous rolling authentication code prompted for is variable and is determined based in part on a geographic location of the device making the access request.

7. The method of claim 3, wherein the length of the segment of the continuous rolling authentication code prompted for is variable and is determined based in part on a status of the server or network the device making the access request is using.

8. The method of claim 1, wherein the continuous rolling authentication code has a new character added every "n" seconds.

9. The method of claim 8, wherein the look back period "y" is calculated by multiplying the number of characters in the segment of continuous rolling authentication code received in response to the prompt for authentication data by "n".

10. A system for processing access requests, comprising:
    a processor; and
    a non-transitory computer readable medium to store a set of instructions for execution by the processor, the set of instructions to cause the processor to:
    receive an access request;
    prompt for authentication data pertaining to the access request, the authentication data comprising a segment of a continuous rolling authentication code comprised of characters;
    receive, in response to the prompt for authentication data, a segment of a continuous rolling authentication code;
    compare the received segment of the continuous rolling authentication code to a window segment of the continuous rolling authentication code of the same segment length beginning at time "x–y" seconds where "x" is the moment at which the received segment was received and "y" is a look back period;
    shift the window segment one character at a time until there is a match between the received segment and a window segment or the time attributable to the shifted window segment is "x";
    authenticate the access request when the received segment of the continuous rolling authentication code exactly matches a window segment; and
    reject the access request when the received segment of the continuous rolling authentication code does not match any window segments.

11. The system of claim 10, wherein the continuous rolling authentication code is generated using a shared secret key time-based one-time password (TOTP) application.

12. The system of claim 10, wherein the continuous rolling code comprises digits, alpha-numeric characters, ASCII characters, symbols, gestures, or any combination thereof.

13. The system of claim 10, wherein the length of the segment of the continuous rolling authentication code prompted for is variable and is determined based in part on the IP address of the device making the access request.

14. The system of claim 10, wherein the length of the segment of the continuous rolling authentication code prompted for is variable and is determined based in part on a device identifier of the device making the access request.

15. The system of claim 10, wherein the length of the segment of the continuous rolling authentication code prompted for is variable and is determined based in part on a geographic location of the device making the access request.

16. The system of claim 10, wherein the length of the segment of the continuous rolling authentication code prompted for is variable and is determined based in part on a status of the server or network the device making the access request is using.

17. The system of claim 10, wherein the continuous rolling authentication code has a new random character added every "n" seconds.

18. The system of claim 17, wherein the look back period "y" is calculated by multiplying the number of characters in the segment of continuous rolling authentication code received in response to the prompt for additional data by "n".

19. At least one non-transitory machine-readable medium comprising a set of instructions executable on at least one computing device to cause the at least one computing device to perform multi-factor authentication, set of instructions to:
receive an access request;
prompt for authentication data pertaining to the access request, the authentication data comprising a segment of a continuous rolling authentication code comprised of characters;
receive, in response to the prompt for authentication data, a segment of a continuous rolling authentication code;
compare the received segment of the continuous rolling authentication code to a window segment of the continuous rolling authentication code of the same segment length beginning at time "x-y" seconds where "x" is the moment at which the received segment was received and "y" is a look back period;
shift the window segment one character at a time until there is a match between the received segment and a window segment or the time attributable to the shifted window segment is "x";
authenticate the access request when the received segment of the continuous rolling authentication code exactly matches a window segment; and
reject the access request when the received segment of the continuous rolling authentication code does not match any window segments.

20. The non-transitory machine-readable medium of claim 19, wherein the continuous rolling authentication code is generated using a shared secret key time-based one-time password (TOTP) application.

21. The non-transitory machine-readable medium of claim 19, wherein the continuous rolling code comprises digits, alpha-numeric characters, ASCII characters, symbols, gestures, or any combination thereof.

22. The non-transitory machine-readable medium of claim 19, wherein the length of the segment of the continuous rolling authentication code prompted for is variable and is determined based in part on the IP address of the device making the access request.

23. The non-transitory machine-readable medium of claim 19, wherein the length of the segment of the continuous rolling authentication code prompted for is variable and is determined based in part on a device identifier of the device making the access request.

24. The non-transitory machine-readable medium of claim 19, wherein the length of the segment of the continuous rolling authentication code prompted for is variable and is determined based in part on a geographic location of the device making the access request.

25. The non-transitory machine-readable medium of claim 19, wherein the length of the segment of the continuous rolling authentication code prompted for is variable and is determined based in part on a status of the server or network the device making the access request is using.

26. The non-transitory machine-readable medium of claim 19, wherein the continuous rolling authentication code has a new character added every "n" seconds.

27. The non-transitory machine-readable medium of claim 26, wherein the look back period "y" is calculated by multiplying the number of characters in the segment of continuous rolling authentication code received in response to the prompt for additional data by "n".

* * * * *